United States Patent

[11] 3,593,629

| [72] | Inventor | Waldemar T. Rentschler<br>Calmbach, Black Forest, Germany |
|---|---|---|
| [21] | Appl. No. | 523,495 |
| [22] | Filed | Dec. 23, 1965 |
| [45] | Patented | July 20, 1971 |
| [73] | Assignee | Prontor-Werk Alfred Gauthier, G.m.b.H.<br>Calmbach, Black Forest, Germany |
| [32] | Priority | Dec. 28, 1964 |
| [33] | | Germany |
| [31] | | G 42395 |

[54] PHOTOGRAPHIC CAMERA WITH AUTOMATIC DIAPHRAGM AND TIME SETTINGS
15 Claims, 11 Drawing Figs.

[52] U.S. Cl. ........................................ 95/10, 95/53, 95/64
[51] Int. Cl. ........................................ G03b 7/08, G03b 9/62
[50] Field of Search ........................................ 95/10, 10 C, 53, 64

[56] References Cited
UNITED STATES PATENTS

| 3,063,354 | 11/1962 | Matulik et al. | 95/10 (C) |
|---|---|---|---|
| 3,292,516 | 12/1966 | Sato et al. | 95/10 (C) |
| 3,205,803 | 3/1963 | Burgarella et al. | 95/10 |
| 3,385,187 | 5/1968 | Bestenreiner | 95/10 |
| 2,978,970 | 4/1961 | Fahlenberg | 95/10 |
| 3,000,281 | 9/1961 | Rentschler | 95/10 |
| 3,098,421 | 7/1963 | O'Hara | 95/10 |
| 3,198,096 | 8/1965 | Koppen | 95/10 |
| 3,344,723 | 10/1967 | Rentschler | 95/10 |
| 3,348,460 | 10/1967 | Schmitt | 95/10 |
| 3,362,309 | 1/1968 | Codper, Jr. et al. | 95/10 |

FOREIGN PATENTS

| 878,166 | 9/1961 | England | 95/10 |

*Primary Examiner*—Samuel S. Matthews
*Assistant Examiner*—Joseph F. Peters, Jr.
*Attorney*—Arthur A. March

ABSTRACT: A photographic camera is provided with automatic light control settings for diaphragm and exposure time. One electronic circuit is provided for setting the diaphragm and another electronic circuit is provided for generating the exposure time. The two electronic circuits are related so that upon actuation of the camera release the circuit for setting the diaphragm is first automatically activated and then thereafter the circuit for generating the exposure time becomes automatically activated.

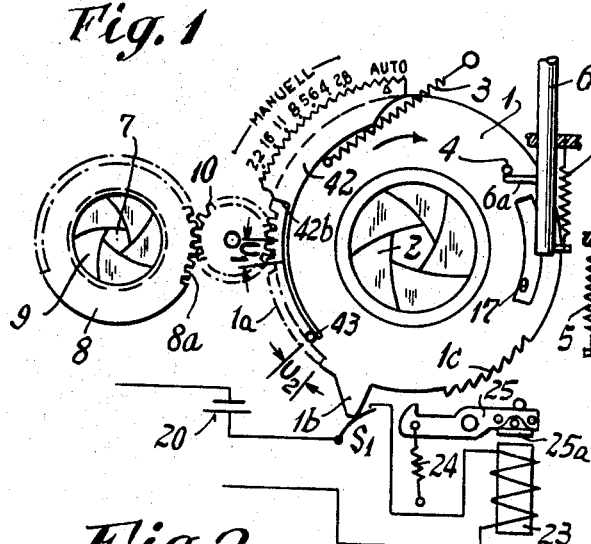
Fig.1
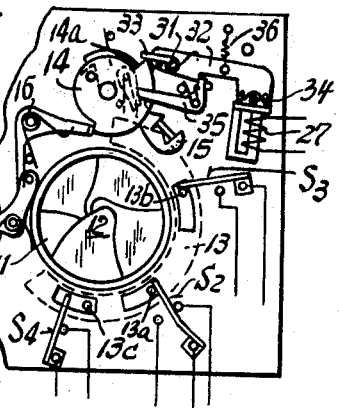
Fig.3
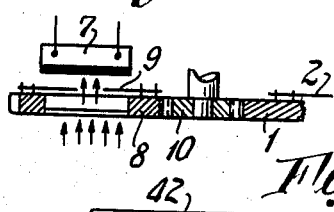
Fig.2
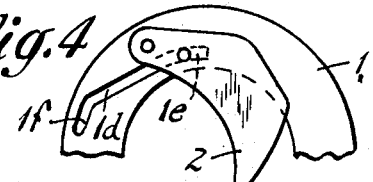
Fig.4
Fig.6
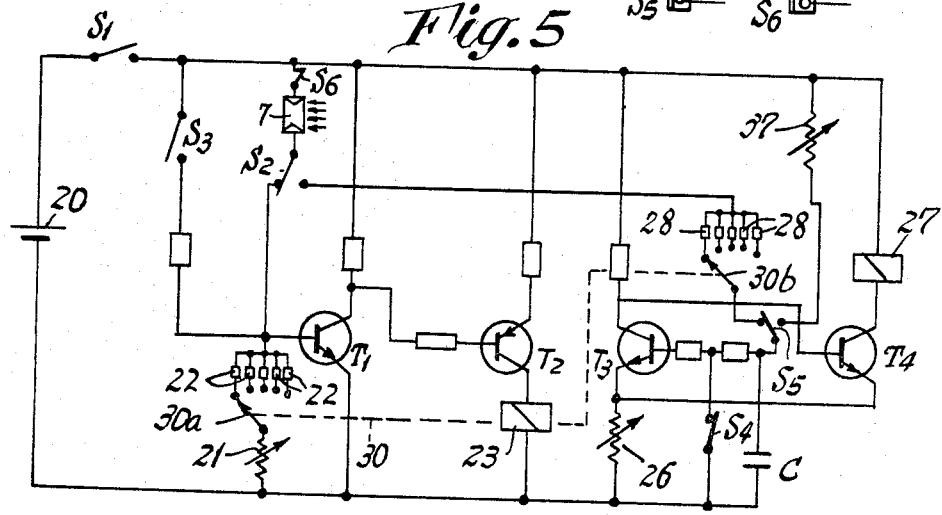
Fig.5
INVENTOR.
Waldemar T. Rentschler
BY
Arthur A. March
ATTORNEY

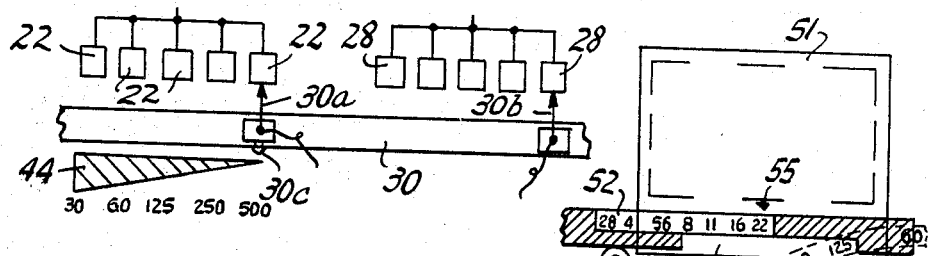
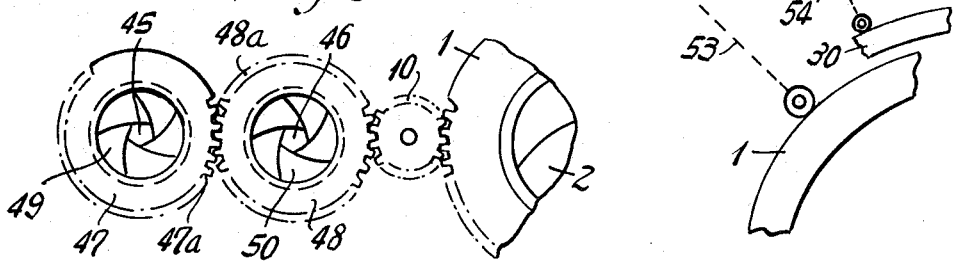
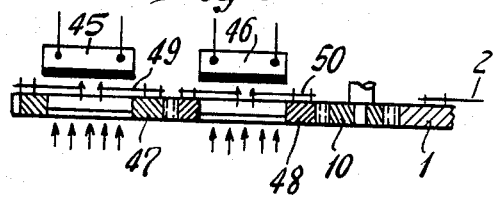
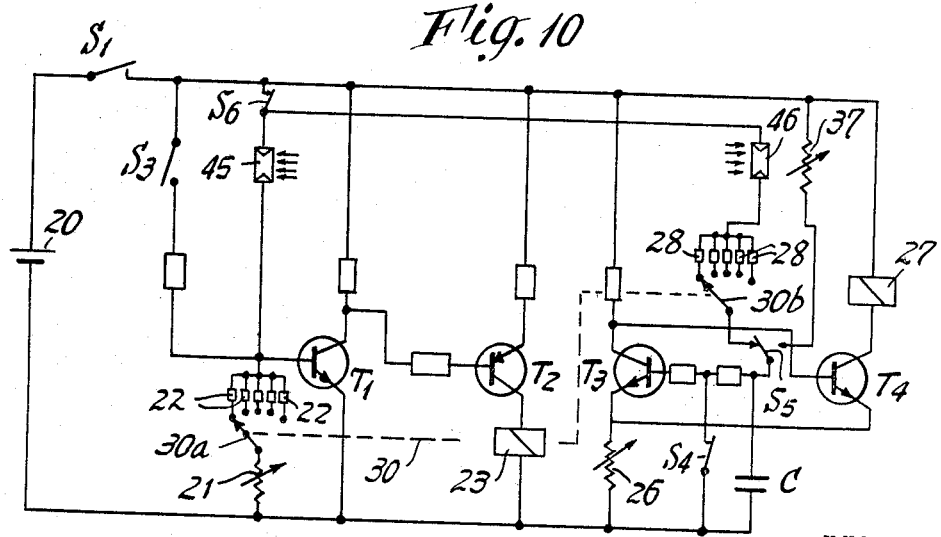

PHOTOGRAPHIC CAMERA WITH AUTOMATIC DIAPHRAGM AND TIME SETTINGS

The present invention relates to a photographic camera in which the diaphragm and time are set automatically as a function of light.

Various solutions for obtaining an electronic automatic exposure system, are known to the art of photographic cameras. For example, cameras have been available with time preselection and electronically controlled diaphragm setting. In such cameras the diaphragm is set automatically through a transistor circuit controlled by a photoelectric cell. In addition, several types of cameras have been known, which feature diaphragm preselection and an automatic electronic system for generating exposure time. In these cases, the diaphragm is, in general, mechanically preset by hand, while the exposure time is generated by means of a light-controlled transistor circuit. This circuit takes at the same time, into consideration the presetting of the diaphragm. Accordingly, automatic cameras are known in which either the exposure time or the diaphragm setting, is generated as a function of the other by means of an electronic circuit.

Known to the art is also an automatic camera which is provided with a program shutter and which no longer requires a moving coil mechanism. This is because the setting of the exposure value is carried out by electronic/mechanical means. However, such an arrangement has to rely on a conventional exposure time generating device (mechanical escapement mechanism) for the purpose of obtaining the exposure time associated with the program.

It is therefore an object of the present invention to provide a light-controlled program shutter requiring neither a moving coil nor an escapement mechanism for generating exposure time. It is intended that an electronic control circuit be used, instead, for generating the exposure time. An additional object of the present invention is to make the program variable.

In order to accomplish this object, the invention provides essentially one electronic circuit for setting the diaphragm, and another electronic circuit for generating the exposure time. In this manner, it is possible to obtain an automatic camera and dispense with the conventional mechanical control devices adapted for setting the diaphragm and generating the exposure time. An advantageous configuration of the invention consists of relating the two electronic circuits so that, upon actuation of the camera release member, the circuit for setting the diaphragm becomes automatically activated first. Immediately thereafter, the circuit for generating the exposure time, becomes automatically activated. It is the purpose of this configuration to provide the conditions required for a reliably operating camera with fully automatic, light-controlled electronic diaphragm and time setting.

In order to obtain extremely simple construction, the invention further provides that a single photoelectric cell be associated with the two control circuits, to take into account the prevailing light conditions. A transfer switch is associated with the photoelectric cell. The switch is controlled by the shutter drive mechanism. Thus, after the setting of the diaphragm by the control circuit has been completed, the circuit for generating the time can be connected to the photoelectric cell by means of this switch.

For the purpose of realizing a fully electronic camera of comparatively simple and reliable construction, the invention further provides that the diaphragm setting be performed with an electronic flip-flop circuit designed to control an electromechanical device. When a specific operating value is reached, this device locks a setting member of the diaphragm, while the generation of the exposure time is accomplished by an electronic circuit including RC circuits and controlling a magnetic locking device capable of influencing the executing motion of the shutter drive mechanism.

In order to obtain a camera with a light-controlled automatic program, and of comparatively simple construction, another feature of the invention provides that the two control circuits for diaphragm setting and time generation, be mutually adjustable by means of variable resistors or capacitors. This arrangement is for determining the operating value of the circuit, so that the setting of diaphragm apertures located within the range of the camera, is always followed by a specific and constant exposure time.

In conjunction with this configuration, the invention further provides that the total range of motion of the setting member for the lens diaphragm and of a cutoff device situated before the photoelectric cell, includes overtravels. These overtravel paths are on both sides of the setting range designed to change the diaphragm aperture. Within these overtravel paths, the diaphragm lamellae maintain the smallest or the largest aperture width. For this purpose, and in accordance with the invention, it is desirable to provide both the lens diaphragm and the diaphragm situated before the photoelectric cell with a setting member having control slots. These slots are designed for opening and closing the lamellae, and include, at both ends, a partial member concentric with the pivot axis.

Another feature of the invention resides in the provision of a program setting member for the purpose of setting different time values which must be paired with the diaphragm operating range. The program setting member controls components as, for example, resistors which serve to change the operating values of the circuits that generate the diaphragm and time. It is the object of this arrangement to make the program of the camera variable with the use of comparatively simple elements, and thereby to make the use of the camera more versatile.

In order to carry out exposures by which the photographer arbitrarily fixes the diaphragm and exposure time, the circuit for generating the time may include an additional variable resistor. Several stepped individual resistors may also be employed. These resistors serve to set specific exposure times by means of a manually operating member. In addition to this arrangement, switches may be included to cancel out the effect of the photoelectric cell on the controlling circuits, when the exposure time setting member is changed from the "AUTO" position to the "MANUAL" setting range.

In addition to including the manual exposure time setting member, the camera is provided with a diaphragm setting member having an "AUTO" position, and a "MAN" setting range. A switch associated with the diaphragm setting member is also provided. The switch permits disconnecting the photoelectric cell from the exposure time generating circuit, when the diaphragm setting member is switched from the "AUTO" position to the "MAN" setting range. In order to obtain interdependence of the setting members for diaphragm and exposure time, when in manual operation, the two setting members may be provided with drivers as, for example, stops. Thus, when one of the setting members is moved into the "AUTO" position, the other setting member is also driven into the "AUTO" position. The switch serving to disconnect the photoelectric cell, thereby is actuated by the motion of either setting member. A still further object of the invention is to provide an indicating device formed essentially of a diaphragm scale driven by the diaphragm setting member. A time scale functionally connected to the program setting member and visible in the view finder, is also provided.

Other objects and advantages of the present invention appear in the following description and specification accompanied by drawings in which:

FIG. 1 shows the view of an electronically controlled diaphragm setting mechanism associated with a cutoff device situated in front of a photoelectric cell. The cutoff device can be moved synchronously with the diaphragm setting member.

FIG. 2 is a top view showing the correlation of the photoelectric cell with the cutoff device.

FIG. 3 shows one embodiment of an electronically controlled shutter mechanism cooperating with the diaphragm mechanism illustrated in FIG. 1.

FIG. 4 is a partial view of the diaphragm setting member designed for positioning the diaphragm lamellae. For purposes of clarity, only one lamella and one control slot for its motion are shown.

FIG. 5 shows the wiring diagram of the combination of electronic control circuits for setting the diaphragm and generating the time for the camera. Only one photoelectric cell is provided for both circuits, to obtain light response effects.

FIG. 6 is a developed view of the diaphragm and exposure time setting members for manual operation.

FIG. 7 is a developed view of the program setting member.

FIG. 8 is a partial view of a camera shutter with separate photoelectric cells for the diaphragm setting circuit and the time generating circuit.

FIG. 9 is a top view of the cutoff devices cooperating with the diaphragm mechanism shown in FIG. 8.

FIG. 10 shows the wiring diagram of control circuits for setting the diaphragm and generating the time, with each circuit being controlled by a separate photoelectric cell.

FIG. 11 shows an indicating device which displays in the view finder, the diaphragm value that has been set, as well as the exposure time associated with the diaphragm operating range.

In accordance with the drawings, setting member 1, as commonly known to the art, acts on lamellae 2 of the lens diaphragm. This setting member 1 is acted on by a tension spring 3 which tends to rotate the setting member in the direction of the arrow shown in FIG. 1. Such rotation is, at first, prevented by pin 4 fixed to the diaphragm setting member 1, and tensionally engaging the camera release member 6 held in starting position by spring 5. Associated with the preceding diaphragm mechanism, is a cutoff device which serves to shade a photoelectric cell 7. Similar to the lens diaphragm, the device is formed substantially of a setting member 8 and of a plurality of lamellae 9 which can be moved by the setting member 8. In order to allow for moving setting member 8 synchronously with the diaphragm setting member 1, a pinion 10 is provided. The pinion meshes with gearing 1a and 8a situated at the circumference of the two setting members 1 and 8 respectively. The arrangement is such that, upon depression of the camera release member 6, the diaphragm setting member 1 follows the release member, and continuously opens the lamellae 2 from the smallest diaphragm value "22" in the direction of the largest diaphragm value "2.8". Due to the gear connection, lamellae 9 of the cutoff device associated with a photoelectric cell 7, also participate in the preceding opening motion. This implies that, as the aperture of the lens diaphragm increases, the photoelectric cell is exposed to an increased amount of light.

The shutter arrangement illustrated in FIG. 3, cooperates with the diaphragm mechanism described above. For purposes of clarity, the shutter arrangement is moved out of the lens axis and is shown separately in the drawing. No detailed explanations will be given in regard to the requirement that the light transmitting aperture 11 of the shutter must be coaxial with the lens passage, since this correlation is well known and obvious. With respect to the shutter arrangement, it is apparent from FIG. 3 that it is of the type whose blades 12 are reciprocable by means of a crank drive acting on a blade operating ring 13. In order to be able to retain the crank drive in cocked position an arresting lever 16 is provided. The crank drive consists essentially of a spring driven driving disc 14 and a pawl 15 acting cooperably on the blade operating ring 13. The arresting lever cooperates at one end with a projection of the driving disc 14, and at the other end with a release lever 17 which can, in turn, also be operated by the camera release member 6. However, this can be done only when the setting (to be described below) of the lens diaphragm, is terminated, and the camera release member has been depressed to such an extent that it occupies the position illustrated by the dashed line in FIG. 3. Pin 6a provided laterally on said release member, acts thereby on the release lever 17.

In order to be able to control the diaphragm mechanism and shutter in relation to the light intensity, and yet dispense with the usual mechanical control devices, electronic controls are provided which function and which may be constructed as described below:

The circuit of FIG. 5 shows a source of energy 20 which is connected to the circuit by means of a main switch $S_1$ actuated during the release of the camera. As especially apparent from FIG. 1, this switch can be operated by means of a control cam 1b provided on the circumference of the lens diaphragm setting member 1. The cam retains the operating tongue of the main switch in the open position when the setting member is in starting position. On the other hand, the cam closes the switch when the release motion starts. Connected to the circuit of the source of energy 20, is the photoelectric cell 7. Both of the controls for setting the diaphragm and time can be connected by means of a throwover switch $S_2$ to cell 7. Switch $S_2$ can be actuated for example by a pin 13a of the blade operating ring 13. The control arrangement for setting the diaphragm consists essentially of two complementary transistors T1 and T2 which are associated with a variable resistor 21. This resistor may, for example, be a potentiometer capable of being set to a specific threshold value, as well as several adapting resistors 22. The functional importance of these resistors 22 will be explained in a subsequent paragraph.

The preceding transistor circuit also includes an electromagnet 23 of an electromechanical device cooperating with the diaphragm setting member 1. This device is formed essentially of electromagnet 23 and of a two-armed lever 25 which can be moved by electromagnet 23 against the action of a spring 24. The lever carries, at one end, an armature 25a located in the magnetic field. At the other end, the lever is in the form of a pawl.

In conjunction with the electromechanical device, the diaphragm setting member 1 includes on its circumference, several intercepting teeth 1c which correspond to the individual diaphragm steps. The teeth may be undercut in the manner that lever 25 remains in the intercepting position against the action of the spring 24, even when the electromagnet 23 is not energized. The battery circuit 20 may also include a switch $S_3$ by means of which, electromagnet 23 can be energized beyond the actual functional period of the transistor circuit. Thus, switch $S_3$ may cooperate, for example, with the blade operating ring 13 of the shutter blades, and may be situated with respect to a stop 13b on the ring, so that the starting of the blade operating ring 13 closes the switch. Electromagnet 23 is thereby energized before switch $S_2$ is reversed.

As already indicated, the control arrangement for setting the diaphragm is also associated with an electronic circuit for forming the timing. This circuit can be connected, by means of switch $S_2$, to the photoelectric cell 7, after the diaphragm setting process is completed. This timing circuit which cooperates with the shutter drive and serves to control a magnetic locking device, consists of two transistors T3 and T4, as well as a capacitor C. The circuit also includes a variable resistor 26, an electromagnet 27, as well as several stepped resistors 28, any of which can be connected into the circuit by means of program setting member 30, to provide a particular exposure time.

The electronic timing circuit also includes a switch S4 which is actuated by a pin 13c fixed to the blade operating ring 13. The pin opens switch $S_4$ during the opening motion of the blade operating ring and shortly before the shutter blades 12 reach the open position.

The magnetic locking device may be formed, as shown by FIG. 3, of an armature lever 32 positioned on a fixed pin 31, and carrying, at one end, an elastic tongue 33. At the other end, an armature 34 is associated with electromagnet 27. The armature lever 32 cooperates with an L-shaped lever 35, one arm of which is impinged by stop lug 14a of disc 14, when shutter blades 12 reach the open position. The driving disc 14 is thereby, blocked. In the cocked position of the shutter, illustrated in FIG. 3, armature 34 engages electromagnet 27 against the action of a restoring spring 36, due to the cooperation of driving disc 14 and armature lever 32. As a result of the spring, armature lever 32 is rotated in counterclockwise direction, as soon as electromagnet 27 has become deenergized. Lever 35 loses thereby its support on the armature lever, and driving disc 14 is allowed to rotate lever 35 in counterclockwise direction, to continue its executing motion and close the shutter again.

The compensating resistors 22 provided in the control circuit for setting the diaphragm, are related to the stepped resistors 28 of the electronic timing circuit. Each resistor of group 22 is associated with one and only one resistor of the other group 28. As is apparent from FIG. 7, the program setting member 30 is provided, for this purpose, with two contact sliders 30a and 30b. One of these sliders engages one of the resistors 22, while the other slider engages one of the stepped resistors 28. The program setting member 30 may also carry an indicator 30c which cooperates with a wedge-shaped time scale 44. On this scale the shortest exposure time may be associated with the tip of the wedge, while a comparatively long exposure time may be associated with the wide end of the wedge. The dashed line in FIG. 5 indicates symbolically the functional connection of the contact sliders 30a and 30b with the program setting member 30. By means of sliders 30a and 30b and resistors 22 and 28 which they respectively contact, the functional values of the diaphragm setting and timing circuits can be mutually adjusted so that, upon setting of the diaphragm apertures within the operating range of the camera, there always results a specific exposure time as, for example, 1/125 sec.

In accordance with FIG. 4, the diaphragm setting member 1 and setting member 8 are provided with radially ascending control slots 1d. These slots have, at both ends, a partial extension 1e or 1f concentric with the pivot axis. Within these partial extensions, the diaphragm lamellae of the lens as well as of the photoelectric cell, maintain the smallest or largest aperture width when the diaphragm setting member 1 is actuated. Due to these concentric partial extensions, the diaphragm setting member 1 is provided, at the start and at the end of the diaphragm setting range, with overtravel paths $U_1$ and $U_2$ respectively. Within these paths and in cases of extreme light conditions, an exposure time other than the one actually associated with the diaphragm operating range, is generated by the electronic circuit.

In conjunction with this special design of the control slots 1d, the operating value of the electromechanical device can be selected in relation to the diaphragm aperture setting, so that a correct and constant exposure time is obtained.

In accordance with the preceding description, the electronic timing circuit is designed so that the aforementioned constant exposure time as, for example, 1/125 sec., is obtained when the prevailing luminous flux corresponds to the operating value selected, and impinges on the photoelectric cell 7.

If, for example, the diaphragm setting member has an operating range from "2.8" to "22", the following three cases may occur:

a. The operating value for the electromechanical device is attained when the diaphragm is at any point within the setting range or, in extreme cases, at either of the end values "2.8" or "22". In this case, the diaphragm aperture setting by the electromechanical device, is always associated with an exposure time preselected by the program setting member 30, and a correct exposure is thus obtained.

b. The light intensity prevailing during the exposure is such, that the electromechanical device becomes activated immediately with the start of motion of the diaphragm setting member 1. This responds to a phase of motion in which the diaphragm value "22" is maintained over the entire setting range of the overtravel $U_1$. At the same time, the timing circuit generates, on the basis of the prevailing light intensity, an exposure time which may be substantially shorter than the preset value. For example, it may occur that the prevailing luminous density is too great to be adequately dealt with by use of the associated values of diaphragm "22", time 1/125 sec. As already indicated a correct exposure on the basis of diaphragm value "22" may, in this case, be obtained if the timing circuit generates, after the shutter has been released, a shorter exposure time than 1/125 sec., as preset by the program setting member 30. The shortest possible exposure time of, for example, 1/500 sec., is obtained when the shutter drive mechanism executes its function in an unhindered manner.

c. The luminous density prevailing during the exposure is too small to allow the electromechanical device to become activated at or before the diaphragm value of "2.8" is attained. In this case, the lens diaphragm remains at "2.8", while the electronic timing circuit generates, on the basis of the diaphragm value "2.8", a longer exposure time than 1/125 sec. The resultant magnitude assures that a correct exposure is obtained.

It is possible that a change occur in the luminous density of the scene to be photographed, within the short time between the diaphragm setting and the executing motion of the shutter drive mechanism. This may, for example, occur when an exposure is carried out by means of a self-timer. In that event, the change in illumination will be compensated automatically by the electronic timing circuit. The constant exposure time (1/60 sec., 1/250 sec., etc.) associated with the actual diaphragm operating range from "22" to "2.8" can be selected, as desired, by means of the program setting member 30. This can be accomplished by changing the operating value through the use of variable resistors in both the timing circuit and the diaphragm setting circuit. Aside from this it is also possible to arrange several stepped resistors in the diaphragm setting circuit, and providing corresponding capacitors in the timing circuit. Another possibility is to superpose a neutral or grey wedge on the photoelectric cell 7 in the commonly known manner, and to provide several resistors or capacitors of different magnitudes, in the timing circuit. These electrical circuits may, moreover, be adapted to take into consideration different film speeds, or they may be used for correcting the degree of density of the exposures.

Therefore, when employing a camera which includes electronic circuitry for setting the diaphragm and generating the exposure time, the programs selectable by means of the program setting member 30, can cover a wide range. As shown in FIG. 7, the program setting member 30 can be positioned either by means of a time scale, or else by means of a symbol scale.

Based on an exposure time of, for example, 1/125 sec., set by means of the programmer 30, the following programs will result (f designating the aperture):

$f=22\leftarrow$overtravel$\rightarrow$
1/500 sec . . . . . . . .

$$f=22 \ldots f=2, 8\leftarrow\text{overtravel}\rightarrow f=2, 8$$
$$1/125 \text{ sec} \quad 1/125 \text{ sec} \ldots \ldots \ldots 1 \text{ sec}$$

In order to allow manual setting of diaphragm and exposure time in the preceding shutter arrangement, the electronic circuit for generating exposure time as shown in FIG. 5, includes an additional variable resistor 37. This resistor allows setting of specific exposure times by means of a manual setting member 28. In addition, the control circuit for generating the time is provided with a transfer switch $S_5$. By means of this switch, stepped resistors 28 can be disconnected from the circuit, and variable resistor 37 may be connected into the circuit. As shown by FIG. 6, the transfer switch $S_5$ as well as another switch $S_6$ which cancels the effect of the photoelectric cell 7 on the electronic circuits in manual operation, can both be actuated by setting member 38. Accordingly, setting member 38 carries two driving pins 39 and 40 arranged so that they keep the contact arms of switches $S_5$ and $S_6$ in the "AUTO" position shown in FIG. 6.

Situated on the exposure time setting member 38, is also a tap 41 which can be applied to resistor 37 in the "Manual" range, corresponding to different settings for exposure time. Moreover, a manual diaphragm setting member 42 capable of being set to "AUTO" and "Manual", is provided on the camera. The two setting members 38 and 42 are coupled to each other so that, when one of the setting members is moved into the "AUTO" position, the other setting member is also moved into the "AUTO" position. Towards this purpose, the setting members are provided with stops 38a and 42a as shown in FIG. 6. Thus, within the "Manual" range, each member, 38 or 42, can be moved independently of the other. This feature is obtained by a staggered arrangement of the scales associated with the setting members. Manually set diaphragm or time values can be secured by commonly known arresting devices (not shown in the drawing).

As apparent from Fig. 1, manual setting of the diaphragm is carried out by means of pin 43 arranged on the diaphragm setting member 1. In the case of "Manual" setting, the pin cooperates with an edge 42b provided on the setting member 42 for the diaphragm. This edge is arranged with respect to pin 43 so that the latter impinges on the edge only after having executed a small amount of overtravel. This prevails even when the diaphragm is set at the value "22", and assures that switch $S_1$ is closed prior to the setting of the diaphragm.

The functional operation of the shutter described above and illustrated in FIG. 1 to 7, is as follows:

Upon depression of the camera release member 6, when the camera is set to "AUTO" in accordance with FIGS. 1 and 6, the diaphragm setting member 1 follows the release motion due to the action of tension spring 3. The main switch $S_1$ is thereby closed. Transistor T4 of the time generating circuit, becomes conductive immediately after switch $S_1$ is closed. In this manner, electromagnet 27 becomes energized, and lever 35 is locked in the position shown in FIG. 3. At the same time, transistor T1 of the time setting circuit is still cut off, since its base is at negative potential due to the high-resistive photoelectric cell 7.

At the start of the opening motion of diaphragm setting member 1, the cutoff device 8—9 of photoelectric cell 7 participates synchronously, and the resistance of cell 7 becomes progressively lower. The operating or threshold value previously set through programmer 30 is thereby, finally reached, and the base of transistor T1 is now at positive potential. This causes transistor T1 to conduct with the result that the base of the transistor T2 which has so far been blocked, now becomes negative. Transistor T2 also conducts thereby, and electromagnet 23 is suddenly energized. As a result, armature 25a is attracted, and lever 25 engages one of the teeth 1c of diaphragm setting member 1. In this manner, the diaphragm has been set correspondingly to the prevailing light conditions.

Upon further depressing camera release member 6, pin 6a rides on the release lever 17, and thereby causes the shutter to be executed in the usual and as commonly known manner. At the start of the preceding motion, switch $S_3$ is closed, and the electromechanical control circuit for the diaphragm continues to function. Immediately thereafter, photoelectric cell 7 is connected to the exposure time generating circuit, by means of pin 13a. This results from the reversal of switch $S_2$.

Shortly before the open position of shutter blades 12 is reached, switch $S_4$ is opened because pin 13c engages its contact arm. Capacitor C thereby starts to charge. When the open position of shutter blades 12 is reached, driving disc 14 impinges with its edge 14a on lever 35. The disc is retained in this position until electromagnet 27 is deenergized. This occurs when capacitor C has become charged to the extent that transistor T3 becomes conductive. Due to the feedback coupling of this transistor with transistor T4, the latter becomes cut off. Consequently, electromagnet 27 is deenergized. After armture lever 32 has thereby, been pivoted by the restoring spring 36, the driving disc 14 moves the lever 35 out of its locked position. Upon continuing its executing motion, the disc returns shutter blades 12 to the closed position.

When the camera is set to the "Manual" range, transfer switch $S_5$ is moved by the exposure time setting member 38, from the position shown in FIG. 6 to the opposite contact position. In this manner, the RC circuit of the electronic time generating circuit is now formed by the manually set resistor 37 and capacitor C. In addition, switch $S_6$ is open, and this cancels the effect of photoelectric cell 7 on the electronic circuits. After the desired exposure time has been set by means of the exposure time setting member 38 which positions variable resistor 37, and after the diaphragm has been set by means of member 42, the camera can be released by actuation of the release member 6. The diaphragm setting member 1, while closing main switch $S_1$, follows the release motion until pin 42 engages edge 42b of the Manual setting ring 42. Thus, the desired diaphragm is set. Upon further depression of the camera release member 6, the shutter is released for its functional execution, and the exposure time is generated in the commonly known manner.

Instead of having a common photoelectric cell for the control circuits associated with diaphragm setting and exposure time generating, the embodiment according to FIGS. 8 to 10 provides a separate such cell 45 or 46 installed for each control circuit. Similar to the embodiment shown in FIGS. 1 to 7, a cutoff device is associated with the photoelectric cells. The cutoff device consists of a setting member 47 or 48, and diaphragm lamellae 49 or 50 actuated by the setting member. The diaphragm setting members 47 and 48 are coupled by gears 47a and 48a, and are driven synchronously by diaphragm setting member 1 through pinion 10 in the same manner as shown in Fig. 2. The arrangement of a photoelectric cell 45 and 46 for the diaphragm setting and exposure time generating circuits, allows the elimination of switch $S_2$ as apparent from Fig. 10. All remaining members of the circuit shown in Fig. 10, correspond to the members shown in Fig. 5, and they also perform the same functions. Accordingly it is unnecessary to provide a separate explanation for the arrangement shown in FIGS. 8 to 10.

In order to allow the set or generated diaphragm and time values to be visible to the photographer, the camera may be equipped with provisions for reading these diaphragm and exposure time values, in the view finder of the camera. Thus, a strip 52 may be arranged in the lower region of a view finder 51, as shown in Fig. 11. The strip 52 is connected to the diaphragm setting member 1 by a gear or transmission link 53 indicated by means of the dashed line. The strip 52 may consist of a green field and two red fields adjacent to the green field, in the commonly known fashion. The strip may also include a diaphragm scale containing values ranging from "2.8" to "22". Moreover, the scale strip 52 may be provided with a recess 52a corresponding to the range of the diaphragm scale and displaying the exposure time values visible on a scale ring 54. The latter scale ring is controlled by the program setting member 30. This indicating device permits the photographer to obtain information about the diaphragm on which the exposure is based, as well as on the depth of focus dependent thereon.

As long as indicator mark 55 visible in view finder 51, points to one of the values on diaphragm scale 52, the exposure is carried out with the time preselected by the program setting member 30. If, on the other hand, indicator mark 55 lies outside of the diaphragm scale as, for example, beyond diaphragm value "2.8" or "22", the photographer may conclude that the control circuit for generating the time provides a longer or shorter exposure time than the one previously set, due to the prevailing light conditions. This indicating device thus prevents the condition that the preceding automatic programming system display no information about the exposure values to the photographer. As a matter of fact, this automatic system provides more information than necessary to obtain the right exposure.

If a camera includes, in addition to the electronic control circuits for diaphragm setting and time generating, an automatic flash system, photoelectric cell 7 or 46 can be used in the flash range of the camera to generate exposure time. In such a camera, the diaphragm aperture may be either constant or variable. An exposure time corresponding to the respective diaphragm aperture, can then be set by means of the electronic time generating circuit. In order to realize this setting of exposure time in the flash range, it is advisable to use as flash source, a device with comparatively long illuminating time as, for example, flashbulbs. In case the camera is provided with a variable set diaphragm, errors of exposure can be avoided by approximately adapting the diaphragm to the range or distance, in the automatic flash range. This can be accomplished by means of a commonly known device for diaphragm/range coupling. This device may also serve to take into account the guide number of the film being used.

I claim:

1. A photographic camera with automatic light-controlled settings of diaphragm and exposure time, including a first electronic circuit means for controlling the setting of camera diaphragm means and a second electronic circuit means for controlling the setting of the exposure time, said first and second electronic circuit means being interconnected, the interconnection being that upon actuation of the camera release member, said first circuit means functions first, and said second circuit means commences to function automatically after said first circuit has begun to function.

2. The photographic camera of claim 1, including:
a single photoelectric cell associated with said first and second circuits, said photoelectric cell taking into account the prevailing light conditions; and a transfer switch actuated by means engaged in the release motion of said camera said switch connecting said cell to said second circuit for generating exposure time after said first circuit for controlling the diaphragm setting has completed executing its function.

3. The photographic camera of claim 2, wherein said first circuit is an electronic flip-flop controlling an electromechanical means which locks in place a setting member of said diaphragm when a specific operating value is obtained, and said second circuit includes RC circuits for generating said exposure time and controls a magnetic locking means for regulating the executing motion of the camera shutter.

4. The photographic camera of claim 1, wherein said first and second circuits include each one resistor for mutually adjusting the operating value of said circuits, said adjustment causing the setting of diaphragm aperture within the camera diaphragm value range to be always followed by a specific constant exposure time.

5. The photographic camera of claim 2, including cutoff means situated in front of said photoelectric cell for regulating the amount of light impinging upon said cell, said cutoff means and lens diaphragm setting member including an overtravel path at each end of the camera range for varying the diaphragm aperture, the diaphragm aperture being smallest within one of said overtravel paths and largest within the other of said overtravel paths.

6. The photographic camera of claim 5 wherein said lens diaphragm and cutoff means include setting members having control slots serving the opening and closing movement of the diaphragm and cutoff means, said slots having at each end an extension concentric with the pivot axis of said setting members.

7. The photographic camera of claim 4 including a control member for setting different exposure time values associated with the diaphragm operating range, said control member cooperating with several adapting resistors for varying the operating values of said first and second circuits.

8. The photographic camera of claim 2, including:
a variable resistor for setting specific exposure times by means of a manual exposure time setting member, said exposure time setting member having positions corresponding to automatic and manual operation; and switches interconnected with said photoelectric cell to cancel the effects of said cell upon said second circuit when said exposure time setting member is transferred from automatic to manual positions.

9. The photographic camera of claim 2 including:
a diaphragm setting member having positions corresponding to automatic and manual operation; and a switch associated with said diaphragm setting member and disconnecting said photoelectric cell from said second circuit when said diaphragm setting member is transferred from automatic to manual positions.

10. The photographic camera to claim 9 wherein said diaphragm and exposure time setting members include driving means causing either one of said setting members to be transferred to said automatic position when the other one of said setting members is moved to automatic position, said switch for disconnecting said photoelectric cell being actuated by the setting member following up the position of the other member.

11. The photographic camera of claim 10 including a diaphragm scale driven by said lens diaphragm setting member, and a time scale coupled to said program setting member, said diaphragm and said time scales being visible in the view finder of said camera.

12. The photographic camera of claim 8 wherein said variable resistor comprises individual stepped resistors.

13. A photographic camera with automatic light-controlled settings of diaphragm and exposure time, characterized by:
a photoelectric cell taking into account the prevailing light conditions; a switch responding to the release motion of said camera and associated with said photoelectric cell; and means for controlling the setting of the diaphragm; means for controlling the generating of exposure time, said switch connecting said photoelectric cell to said means for controlling the generating of exposure time after said means for controlling setting of the diaphragm has completed its function.

14. A photographic camera with automatic light-controlled settings of diaphragm and exposure time, characterized by:
a diaphragm setting circuit and a time generating circuit; resistors and capacitors interconnected with said circuits for adjusting said circuits mutually to obtain the operating value of said circuits and causing the setting diaphragm aperture with the camera range to be followed by a specific constant exposure time; electromechanical means controlled by said diaphragm setting circuit and locking in place said diaphragm when a specific operating value is reached; and magnetic locking means controlled by said time generating circuit and regulating the executing motion of the camera shutter, said time generating circuit including RC circuits for obtaining the exposure time.

15. A photographic camera with settings of diaphragm and exposure time controlled by photo resistance means, said camera including a first electronic circuit means for controlling the setting of camera diaphragm means, a second electronic circuit means for controlling the shutter means for setting of the exposure time, said diaphragm means being operable to follow the movements of a camera release member, said diaphragm means being operable to be blocked by electromagnetic locking means controlled by said first electronic circuit for setting of said diaphragm means, and shutter being actuatable for runoff by said second electronic circuit means after said diaphragm means has been set by said first electronic circuit means.